July 7, 1936.  E. BLETZ  2,046,718

TEMPERATURE CONTROL SYSTEM

Filed April 2, 1935

WITNESSES:
Leon J. Taza.
Wm. C. Groome

INVENTOR
Edward Bletz.
BY
W. R. Coley
ATTORNEY

Patented July 7, 1936

2,046,718

UNITED STATES PATENT OFFICE 2,046,718

TEMPERATURE CONTROL SYSTEM

Edward Bletz, Lexington, Ohio, assignor to Westinghouse Electric & Manufacturing Company, East Pittsburgh, Pa., a corporation of Pennsylvania Application April 2, 1935, Serial No. 14,264

6 Claims. (Cl. 219—20)

My invention relates to electrically heated cooking devices and particularly to temperature control systems for such devices.

An object of my invention is to provide a relatively simple control system for obtaining predetermined temperature cycles in the cooking chamber of a cooking device.

Another object of my invention is to provide a plurality of unitary thermally controlled switches to control a heat source to selectively obtain any one of a plurality of temperature cycles in a cooking chamber.

Another object of my invention is to provide a temperature control system for controlling the energization of an electric heating element associated with a cooking chamber in such manner as to obtain a momentary peak temperature in the cooking chamber and thereafter a maintained lower temperature cycle in the cooking chamber.

Another object is to provide unitary thermal switches cooperating to control a heat source to obtain a predetermined temperature cycle in a cooking chamber.

Other objects of my invention will either be specifically pointed out hereinafter during the course of a description of a system embodying my invention or will be apparent without further mention thereof.

In practicing my invention, I provide a pair of substantially similar unitary thermal switches subjected to the temperature of a cooking chamber, one of said switches having a temperature differential of operation greater than that to which it will be subjected during the normal operation of the system, while the second thermally actuable switch is operable at a lower maintained temperature, the two switches being connected in parallel circuit relation relatively to each other and in such manner as to control the energization of the heating element.

In the accompanying single sheet of drawings.

In the preparation of certain kinds of foods, particularly roasts of meat, it has long been recognized that the most desirable temperature cycle to which a roast of meat should be subjected is one including a relatively short peak temperature and thereafter a longer maintained lower average temperature, the latter temperature being continued for a length of time sufficient to cook the roast of meat to the desired degree.

Figure 1:
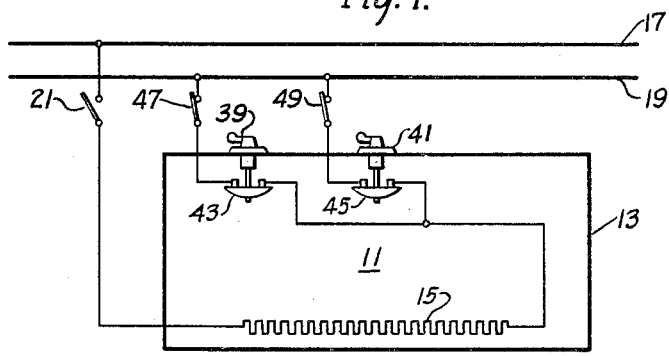
Figure 1 is a diagram of connections showing generally a system and its component parts embodying my invention.

Referring first to Fig. 1 of the drawing, I have there illustrated a cooking chamber 11 which may be defined by a plurality of enclosing walls 13, and since the system more particularly embodying my invention is applicable to many different forms of cooking chambers, cooking appliances or range ovens, I have elected to show the oven chamber and the enclosing walls schematically only.

An electric heating element 15, which may be of any desired type and construction, is operatively associated with the cooking chamber 11, and while I have shown it as being located in said chamber, I do not desire to be restricted thereto, and here again any suitable or desired form of electric heating element may be utilized.

A suitable source of supply of electric energy is indicated by supply-circuit conductors 17 and 19, and it is to be understood that any suitable type of manually operable control switch 21 may be employed, although I have illustrated it as an ordinary knife switch. If desired, a time-controlled switch (not shown in the drawing) may be utilized in a manner now well known in the art. The switch 21 is connected in series circuit relation with heating element 15.

Figure 2:
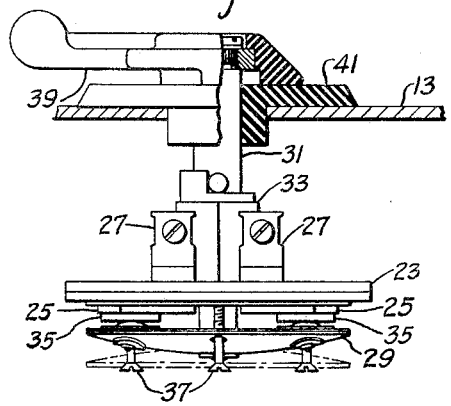
Fig. 2 is a view mainly in side elevation of one of the thermally actuable switches which I utilize in my improved system.

I utilize two unitary thermally actuable switches 43 and 45 which may, for instance, be supported from one of the walls 13 of the oven chamber 11, as shown in Fig. 1, and the construction of each of which is shown in Fig. 2 of the drawing. Briefly, each switch includes a base 23, which may be of substantially circular shape in outline, and which has insulatedly mounted adjacent one face thereof a plurality of substantially fixed contact terminal members 25, certain of these members being provided with terminal extensions 27 to permit of connecting thereto suitable leads in a manner well known in the art.

A bimetallic disc 29 is loosely supported adjacent the end of an adjustable stud 31, which stud extends through a tubular member 33, which is fixedly mounted on the base 23. Disc 29 is preferably made in accordance with the disclosure in Patent No. 1,448,240, to J. A. Spencer. A disc of this kind, which is initially dished in a given direction, will operate from one limiting position to its opposed limiting position (which is shown by the broken lines in Fig. 2 of the drawing) with a sudden movement or with a snap-action, under predetermined temperature conditions. The disc has insulatedly mounted thereon adjacent its periphery a plurality of contact bridging members 35, and the movement of the peripheral portions of the disc away from the base 23 may be limited by a plurality of stop pins 37. For further details of construction of the switch, reference may be had to my issued Patent No. 1,873,271, assigned to the same assignee as is the present application. An adjusting arm 39 is mounted on the outer end of stud 31, and, as shown in Fig. 1 of the drawing, the outer end of the stud is preferably located outside of the oven walls 13, as is also the actuating arm 39. A substantially fixed washer 41 may be provided to surround each of the respective studs 31 upon which there may be provided a suitable set of marks to indicate temperature and to cooperate with the short end of arm 39.

A snap-acting disc 29 of the kind disclosed and claimed in Spencer Patent No. 1,448,240 has the characteristic of having an appreciable temperature differential of operation; that is, if the snap-acting disc moves from the position shown in the full lines in Fig. 2 of the drawing to that shown by the broken lines in Fig. 2 of the drawing at a temperature of, say, 400°, the temperature must drop an appreciable amount, say, on the order of 50° to 75° before the disc will return to its original position in which the cooperating contact members are in engagement, so that the circuit controlled by the switch is closed.

Snap-acting switch 43, as shown in Fig. 1 of the drawing, is so designed and constructed that it will have a relatively high temperature differential of operation so that if the disc moves to its open position at a temperature of, say, 550° F., it will not return to its initial or closed position until the temperature thereof has reached a value on the order of 100° F. or slightly lower.

The second thermally actuable switch 45 is of the type described above where it was stated that if the disc is moved from its initial closed position to its open position at a temperature of, say, 400° F. it would reclose the circuit controlled thereby at a temperature of around 350° F.

As shown in Fig. 1 of the drawing, the two switches 43 and 45 are connected in parallel circuit with each other and in series with the heating element 15, a manually operable switch 47 being connected between the switch 43 and supply circuit conductor 19, while a manually operable switch 49 is connected between switch 45 and supply circuit conductor 19. The two switches 43 and 45 will, therefore, severally control the energization of the heating element 15. Each of the switches 43 and 45 is of the unitary or self-contained type, comprising not only the thermally-actuable element but also a contact member directly carried and actuated thereby.

Figure 3:
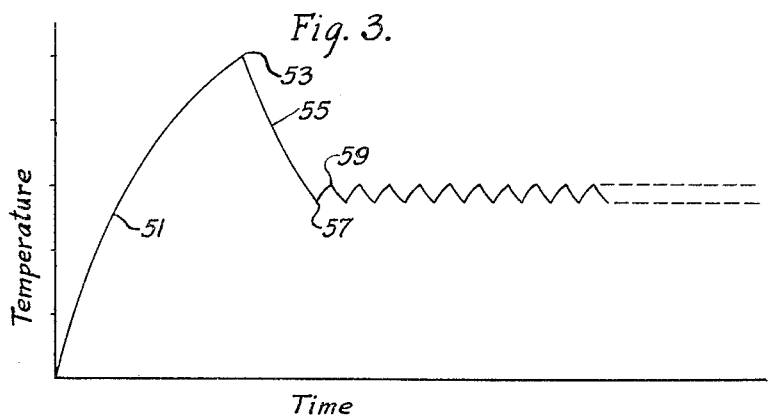
Fig. 3 is a curve showing the preferred temperature cycle obtainable by the use of the system embodying my invention.

Referring now to Fig. 3 of the drawing, I have there illustrated generally only the preferred temperature cycle which I desire to obtain by the use of the two switches having the above described operating characteristics and connected as shown in Fig. 1 of the drawing. Let it be assumed that switches 21, 47, and 49 have all been closed. The heating element 15 is thereby energized and the temperature in cooking chamber 11 will rise, as shown by portion 51 of the temperature curve in Fig. 3 of the drawing. At a temperature of approximately 400°, switch 45 will open its circuit, but since switch 43 is still in its closed position, there will be no effect upon heating element 15. The temperature in the oven chamber will, therefore, continue to rise until at a point 53, which may be at a temperature of substantially 550°

F., switch 43 will open also, thereby deenergizing heating element 15. The temperature in the cooking chamber 11 will now gradually drop, as shown by portion 55 of the temperature curve in Fig. 3 of the drawing, and since, as was hereinbefore set forth, the disc of switch 43 will not reclose until its temperature reaches approximately 100° F., it will not immediately reclose, but switch 45 will reclose at a temperature on the order of 350° F., as was hereinbefore set forth and as is indicated by point 57 at the lower end of portion 55 of the temperature curve. This action reenergizes the heating element 15, and the temperature in the cooking chamber is thereby again increased, until at a temperature value on the order of 400° F. switch 45 is again opened, as is indicated by the point 59. This alternate sequential closing and opening of the switch 45 will continue for as long as the circuit is energized, and final deenergization of the heating element 15 may be effected by opening switch 21.

The temperature in the cooking chamber will then decrease until it finally reaches room temperature. As the ordinary room temperature may be considered to be on the order of 70° F., it is evident that switch 43 will finally move to its closed position, but that this operation will not occur during the normal operation of the cooking utensil and that the cooking device must be allowed to rest without energization of the heating element before the switch 43 will return to its initial closed position.

It is, therefore, evident that by utilizing a thermally actuable switch, having an operating characteristic that will permit it to operate once only, after which it will remain in such operated or open-circuit position, and connected in parallel circuit with a thermally actuable switch having a somewhat different operating characteristic I provide for obtaining a short-time peak temperature and thereafter a lower maintained average temperature.

If it should be desired to utilize a peak temperature only, this may be effected by leaving switch 49 in its initial open position and closing only switches 21 and 47. The temperature in the cooking chamber 11 will, therefore, arise to a predetermined peak temperature and will thereafter gradually decrease, it being understood that the required cooking will be completed before the cooking chamber temperature drops to 100° F., so that switch 21 will be opened by the operator before thermally-actuable switch 43 recloses to effect repetition of this cooking cycle. If, however, it is desired to operate at the lower maintained average temperature, this can be effected by closing switches 21 and 49 only and leaving switch 47 in its open position. With this set of conditions, the lower maintained average temperature can be obtained in the cooking chamber for as long as the supply of electric energy to the system is continued.

Since it is very desirable to be able to control not only the peak temperature as obtained by switch 43, but also the lower maintained average temperature as determined by the operation of switch 45, I preferably utilize the adjustable disc, as is shown in Fig. 2 of the drawing, so that either or both operating temperature values obtained by the use of the two switches can be obtained as may be desired by an operator.

The system embodying my invention is, therefore, effective not only to obtain a certain temperature cycle in a cooking chamber comprising a momentary peak temperature and thereafter a lower maintained temperature, but may also be selectively utilized to obtain a momentary peak and then a gradually reducing temperature in the cooking chamber, or to obtain a lower maintained average temperature in the cooking chamber as may be desired by an operator to effect different cooking operations.

Various modifications may be made in the device embodying my invention without departing from the spirit and scope thereof, and I desire, therefore, that only such limitations shall be placed thereon as are imposed by the prior act or are set forth in the appended claims.

I claim as my invention:

1. In combination with an electric cooking device including a cooking chamber and a heating element therefor, means controlling the heating element to obtain a short-time peak temperature and then a lower maintained average temperature in the cooking chamber, said means including a pair of thermostatic switches responsive to the chamber temperature electrically connected in parallel with each other and severally controlling the energization of the heating element, one of said switches opening and closing at substantially the lower maintained temperature value and the other switch opening its circuit at a temperature above said maintained temperature and reclosing it at a temperature below said maintained temperature.

2. In combination with an electric cooking device including a cooking chamber and a heating element therefor, means controlling the heating element to obtain a short-time peak temperature and then a lower maintained average temperature in the cooking chamber, said means including a pair of thermostatic switches responsive to the chamber temperature electrically connected in parallel with each other and severally controlling the energization of the heating element, one of said switches being designed and constructed to open its circuit at a predetermined peak temperature value and to thereafter remain in its open position during normal lower cooking temperature conditions in said cooking chamber and the second switch being designed and constructed to open and close its circuit at temperature values slightly above and below the desired average maintained temperature value.

3. In combination with an electric cooking device including a cooking chamber and a heating element therefor, means controlling the heating element to obtain a short-time peak temperature and then a lower maintained average temperature in the cooking chamber, said means including a pair of thermostatic switches responsive to the chamber temperature electrically connected in parallel with each other and severally controlling the energization of the heating element, the first of said switches having a large temperature differential of operation and being effective to limit the temperature rise in the cooking chamber to a predetermined peak value and then remaining in its open position during lower normal cooking temperature conditions, and the second switch having a smaller temperature differential of operation and being effective to maintain an average temperature value in the cooking chamber lying between said peak value and the temperature at which said first switch recloses.

4. In combination with an electric cooking device including a cooking chamber and a heating element therefor, means controlling the heating element to obtain a short-time peak temperature and then a lower maintained average temperature in the cooking chamber, said means including a pair of thermostatic switches responsive to the chamber temperature electrically connected in parallel with each other and severally controlling the energization of the heating element, the first of said switches having a temperature differential of operation greater than that to which it is to be subjected during lower normal cooking temperature conditions and effective to deenergize the heating element at a predetermined peak temperature and to thereafter remain in its open position during such remainder of the normal cooking operation and the second of said switches being effective to alternately energize and deenergize the heating element to maintain an average temperature in the cooking chamber lying between said peak temperature and the temperature at which said first switch recloses.

5. In combination with an electric cooking device including a cooking chamber and a heating element therefor, thermally actuable means controlling the heating element to obtain any one of a plurality of different temperature cycles in the cooking chamber, said means including a pair of unitary thermostatic switches responsive to chamber temperature, electrically connected in parallel with each other and in series with the heating element, the first of said switches comprising a snap-acting bimetal element having a temperature differential of operation greater than that to which it will be subjected during normal lower cooking temperature conditions, a second switch comprising a snap-acting bimetal element having a smaller temperature differential of operation, and adapted to open and close at temperature values lying between the temperature values at which said first switch opens and closes, and means for enabling and disabling said switches whereby when said first switch alone is enabled, it will control the heating element to obtain a short-time peak temperature and then a gradually decreasing temperature in the cooking chamber, when said first switch is disabled and said second switch is enabled it will control the heating element to obtain a lower maintained average temperature value in the cooking chamber and when both switches are enabled a monetary peak temperature and then a lower maintained average temperature is obtained in the cooking chamber.

6. In combination with an electric cooking device including a cooking chamber and a heating element therefor, means controlling the heating element to obtain a short-time peak temperature and then a lower maintained average temperature in the cooking chamber, said means including a pair of thermostatic switches responsive to the chamber temperature electrically connected in parallel with each other and severally controlling the energization of the heating element, said switches having widely different ranges of temperature between the upper closing limit and the lower opening limit to thereby permit automatic opening and closing operations of the narrow-range switch after the upper-limit opening operation of the broad-range switch, the latter remaining open during such opening and closing operations of the narrow-range switch.

EDWARD BLETZ.